United States Patent
Parth

(10) Patent No.: US 11,812,677 B2
(45) Date of Patent: Nov. 14, 2023

(54) SURFACE GRADER ATTACHMENT FOR A TRACTOR

(71) Applicant: Geraldine Parth, Denver, CO (US)

(72) Inventor: Geraldine Parth, Denver, CO (US)

( * ) Notice: Subject to any disclaimer, the term of this patent is extended or adjusted under 35 U.S.C. 154(b) by 84 days.

(21) Appl. No.: 16/844,788

(22) Filed: Apr. 9, 2020

(65) Prior Publication Data

US 2020/0323122 A1 Oct. 15, 2020

Related U.S. Application Data

(60) Provisional application No. 62/832,261, filed on Apr. 10, 2019.

(51) Int. Cl.
*A01B 31/00* (2006.01)
*A01B 63/24* (2006.01)

(52) U.S. Cl.
CPC .............. *A01B 31/00* (2013.01); *A01B 63/24* (2013.01)

(58) Field of Classification Search
CPC ................................. A01B 63/24; A01B 31/00
See application file for complete search history.

(56) References Cited

U.S. PATENT DOCUMENTS

| | | | | |
|---|---|---|---|---|
| 350,762 A * | 10/1886 | Neutascher | ............ | A01B 31/00 172/435 |
| 898,695 A * | 9/1908 | Sosa | ....................... | A01B 31/00 172/612 |
| 3,684,031 A * | 8/1972 | Reynolds | ............... | A01B 31/00 172/684.5 |
| 4,196,778 A * | 4/1980 | Smith | .................... | E02F 3/7622 172/451 |
| 4,448,258 A * | 5/1984 | Mork | .................... | A01B 49/027 172/197 |
| 4,836,295 A * | 6/1989 | Estes | .................... | E01C 23/0825 172/170 |
| 4,886,124 A * | 12/1989 | Kleinhuizen | .......... | A01B 31/00 172/612 |
| 5,024,280 A * | 6/1991 | Mork | .................... | E02F 3/7622 172/197 |
| 5,191,944 A * | 3/1993 | Thorn | .................... | A01B 45/00 172/684.5 |
| 5,213,164 A * | 5/1993 | Mork | .................... | E02F 3/8152 172/684.5 |
| 5,771,980 A * | 6/1998 | Mork | .................... | E02F 3/8152 172/449 |
| 6,454,018 B2 * | 9/2002 | Tozer | .................... | E01C 23/082 172/29 |
| 6,467,552 B1 * | 10/2002 | Whatmough | .......... | A01B 31/00 172/445.1 |
| 6,845,824 B2 * | 1/2005 | Miskin | .................... | E02F 3/402 37/444 |
| 8,083,005 B1 * | 12/2011 | Nicolai | .................. | A01B 31/00 172/779 |
| 9,371,617 B2 * | 6/2016 | Thunstrom | ............ | A01B 45/00 |

(Continued)

*Primary Examiner* — Gary S Hartmann
(74) *Attorney, Agent, or Firm* — WILLIAM LOVIN & ASSOCIATES LLC; William R. Lovin

(57) ABSTRACT

A surface grader mechanism that is attached to, and dragged behind, tractors or other towing vehicles. This implementation of such a surface grader includes a blade at the leading edge that may be adjusted to any height or any transverse, horizontal angle above the metal grating on the bottom of the surface grader.

12 Claims, 3 Drawing Sheets

(56) References Cited

U.S. PATENT DOCUMENTS

| | | | |
|---|---|---|---|
| 2006/0289180 A1* | 12/2006 | Wentling | E02F 3/76 |
| | | | 172/817 |
| 2007/0012464 A1* | 1/2007 | Juergen | A01B 31/00 |
| | | | 172/145 |
| 2007/0267204 A1* | 11/2007 | Grosberg | A01B 1/00 |
| | | | 172/383 |
| 2009/0071668 A1* | 3/2009 | Hennigar | A01B 31/00 |
| | | | 172/612 |
| 2018/0343783 A1* | 12/2018 | Ayers | A01B 31/00 |

* cited by examiner

SURFACE GRADER ATTACHMENT FOR A TRACTOR

CROSS-REFERENCE TO RELATED APPLICATIONS

This application takes benefit of U.S. Prov. App. No. 62/832,261 filed Apr. 10, 2019 and incorporates it, in its entirety, by reference.

FIELD OF THE INVENTION

This invention relates to surface grader mechanisms that are attached to, and dragged behind, tractors or other towing vehicles.

BACKGROUND OF THE INVENTION

The need to grade soil surfaces is universal. The main difficulty using linearly aligned graders is that at the end of the linear grade line the tractor must be pointed in the opposite direction so that a second adjoining parallel grade line may be achieved.

Grader attachments that are affixed to the back end of tractors and other conveyances such as box blades, box scrappers, or grader scrapers have been developed to facilitate the final scraping and leveling of the soil surface with less difficulty.

A box blade with scarifiers is a 3-sided metal box, with front and rear scraping blades that sit across the bottom of the rear panel. It is used primarily for spreading material like soil or gravel, and for grading, leveling, or backfilling an area of land. Scarifiers are comprised of angled metal teeth, mounted in a row on a crossbeam across the upper width of the box blade. The box blade is wider that it is long.

A grader/scraper has at least one grading blade which lets material flow around the at least one blade to get an even distribution of material simply by dragging the tool over loose earth. The grader/scraper has a front row of adjustable teeth for breaking up the ground if need be. The grader/scraper is wider that it is long.

What is needed therefore is a grader/scraper that has one blade and an extensively large smoothing surface behind the blade.

Also, what is needed is a grader/scraper where the smoothing surface behind the blade is about the same length and width.

Also, what is needed is a grader/scraper that is very heavy with its smoothing surface constructed of expanded metal grating weighing at least 4 pounds per square foot wherein the entire constructed grader/scraper apparatus weighs at least 10 pounds per square foot.

SUMMARY OF THE INVENTION

The present invention is a tractor attached grader/scraper unit that has one steel grader blade at the front, is approximately as long as it is wide, and is constructed with an extensive smoothing surface behind the blade constructed of expanded metal grating weighing at least 4 pounds per square foot. The entire constructed grader/scraper apparatus weighs at least 10 pounds per square foot. The first embodiment in the present application is approximately six feet long and approximately six feet wide and weighs approximately 780 pounds or twenty-two pounds per square foot.

The present invention is comprised of a steel frame, generally square when viewed from above, and generally as long as it is wide. Affixed to the bottom of the frame is a smoothing surface constructed of expanded metal grating weighing at least 4 pounds per square foot. The first embodiment of the entire constructed grader/scraper apparatus weighs approximately twenty-two pounds per square foot.

Attached to the front part of the frame is a reversable steel grader blade. The grader blade is as wide as the frame and the frame is generally as wide as the frame is long. The grader blade is positioned so that it is perpendicular to the surface of the ground and slightly above the plane of the surface of the ground. By this means, the blade disperses larger graded material in front of it and allows only suitably sized graded material to pass underneath it and the smoothing surface. Blades may be affixed in any one of a series of heights beginning one-quarter inch above the plane of the earth. In the embodiment of the invention disclosed here, the grader blade is affixed one-half of an inch above the surface of the earth and lies horizontal with the surface of the earth. In alternative embodiments of the present invention, the grader blade is affixed such that it is not horizontal to the surface of the earth, i.e. it describes an angle with respect to the surface of the earth.

An inverted Y-shaped yoke is positioned vertically from the frame at the front of the device. The yoke attaches at the bottom to mounting braces that proceed from the front of the frame to the rear of the frame. At the top, a mounting point is formed such that the draw bar of the attached tractor may be affixed. Proceeding from the top of the yoke to each mounting brace is a stabilizing chain. The mounting point may have three or more pairs of mounting holes drilled or otherwise formed in it providing options for attaching the draw bar from the tractor to cause the grader blade to either cut, float, or tail drag.

DETAILED DESCRIPTION OF THE INVENTION

In the following description, numerous specific details regarding possible materials for componentry (e.g., steel, iron, screen) and construction methods (welding, bolting) are set forth. Those skilled in the art will recognize, however, that the invention may be practiced apart from these specific details. In other instances, details well known and widely used in the process of manufacturing such equipment and various miscellaneous components have been omitted, so as not to unnecessarily obscure the present invention.

Turning now to FIGS. 1-7, grader/scraper 100 is constructed of painted or thermally coated steel or iron sheet and mesh. The grader/scraper 100 is affixed to the draw bar of a tractor at mounting point 104. Mounting point 104 is the topmost portion of inverted Y-shaped yoke 102. Mounting point 104 may have three or more pairs of mounting holes drilled or otherwise formed in it providing options for attaching the draw bar from the tractor to cause the grader blade to either cut, float, or tail drag.

Figure 4:
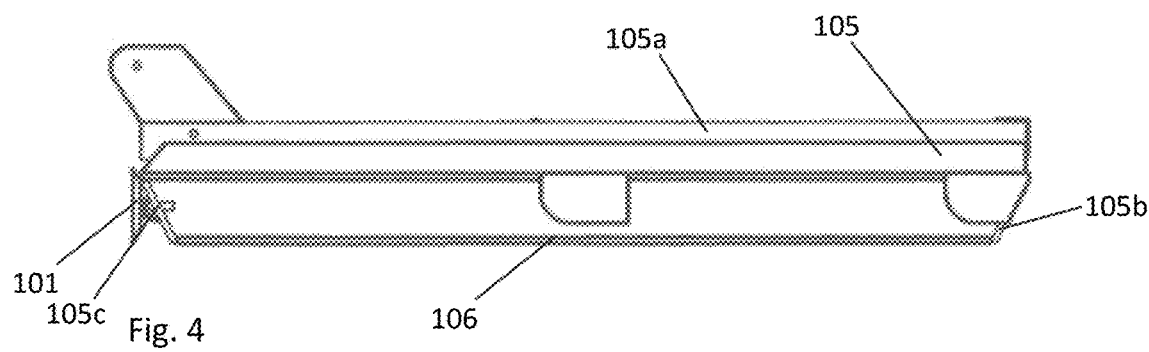
FIG. 4 is a side elevation of the frame and smoothing surface of the present invention.
Figure 5:
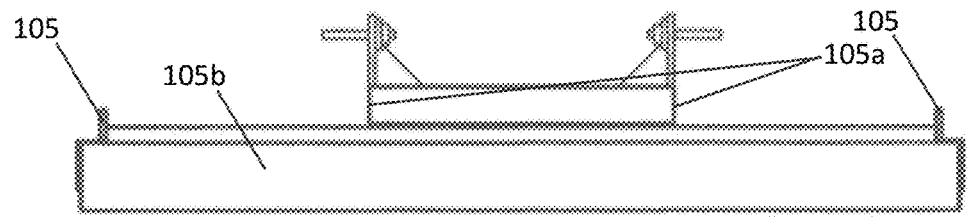
FIG. 5 is a rear elevation of the frame and smoothing surface of the present invention.
Figure 6:
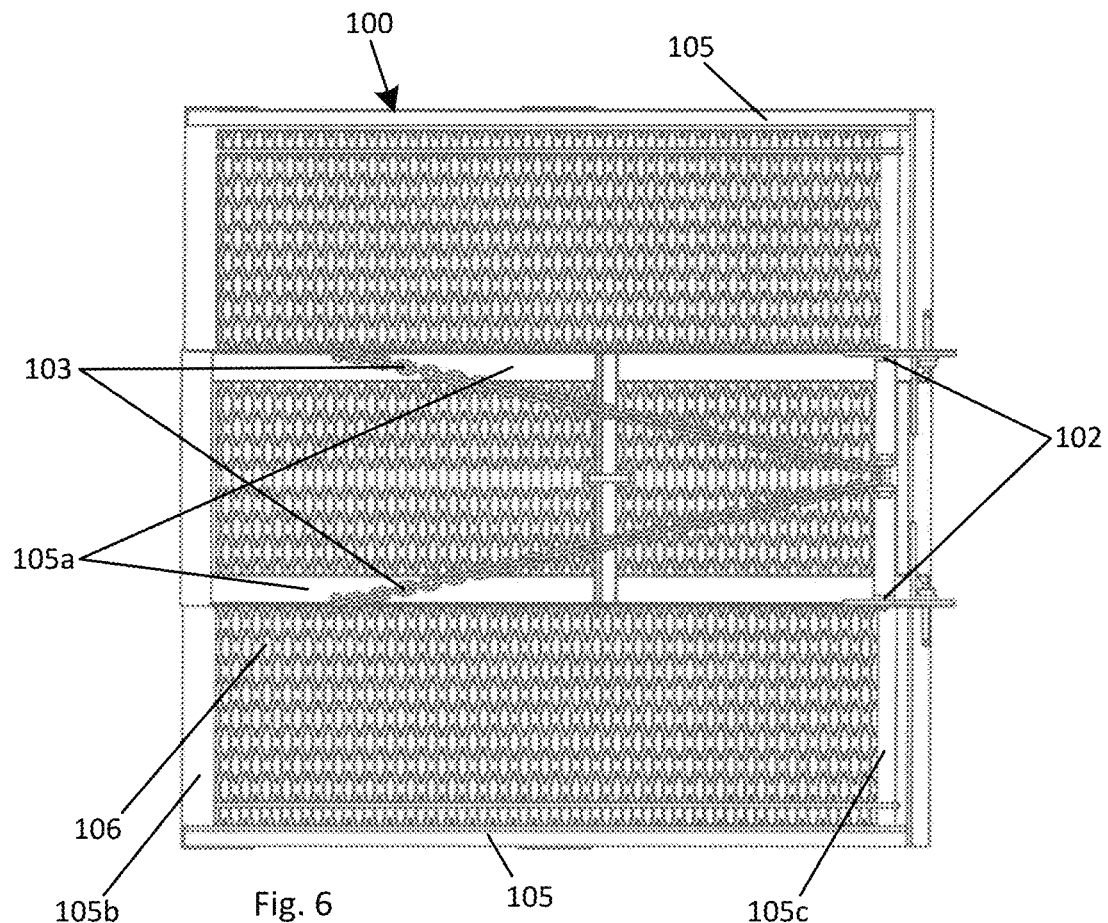
FIG. 6 is a plan view of the present invention.
Figure 7:
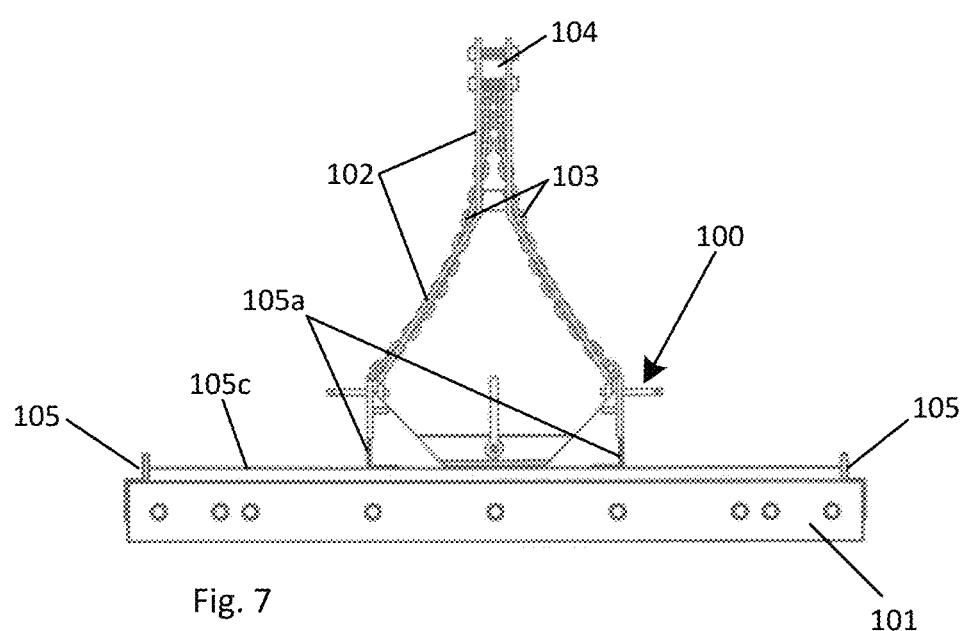
FIG. 7 is a front elevation of the present invention.

Grader/scraper 100 has a steel grader blade 101 mounted transversely at its front, said steel grader blade 101 being approximately as wide in the transverse direction as grader/scraper 100 unit is long. Referring specifically to FIG. 4, when viewed from the side, steel grader blade 101 is mounted essentially perpendicular to the surface of the earth. Grader/scraper 100 is constructed with an extensive smoothing surface 106 behind steel grader blade 101 constructed of expanded metal grating weighing at least 4 pounds per square foot. Such an implementation of grader/scraper 100 weighs at least 10 pounds per square foot, although much heavier embodiments are acceptable. For example, the first embodiment of the present invention weighs approximately 22 pounds per square foot. This weight allows it to maintain a uniform and consistent pressure on the terrain surface whereas a conventional boxscraper attachment is much lighter and only follows, or bounces along, the terrain surface.

Grader/scraper 100 is comprised of steel frame 105 (comprised of 105a, 105b, and 105c) generally square when viewed from above, and approximately as long as it is wide. Affixed to the bottom of steel frame 105 is smoothing surface 106 constructed of expanded metal grating weighing at least 4 pounds per square foot.

Attached to the forward part of steel frame 105 is a reversible steel grader blade 101. Steel grader blade 101 is as wide transversely as is steel frame 105. Steel grader blade 101 is affixed to steel frame 105 so that it is perpendicular to the surface of the earth and slightly above the plane of smoothing surface 106. By this means, steel grader blade 101 disperses larger graded material in front of it and allows only suitably sized graded material to pass underneath it and smoothing surface 106. Steel grader blade 101 may be affixed to steel frame 105 at any one of a series of heights beginning one-quarter inch above the plane of the earth. In the embodiment of the invention disclosed here, steel grader blade 101 is affixed horizontally to steel frame 105 so that it is one-half of an inch above the surface of the earth and lies horizontal to the surface of the earth. In alternative embodiments of the present invention, steel grader blade 101 is affixed to steel frame 105 such that it is not horizontal to the surface of the earth, i.e. it describes an angle with respect to the surface of the earth.

Inverted Y-shaped yoke 102 is positioned vertically from steel frame 105 at the front of the device. Inverted Y-shaped yoke 102 attaches at its bottom to mounting braces 105a that proceed from front 105c of steel frame 105 to rear 105b of steel frame 105. At its top, mounting point 104 is formed such that the draw bar of a tractor may be affixed. Proceeding from the lateral aspects of mounting point 104 of inverted Y-shaped yoke 102 to each mounting brace 105a is a stabilizing chain 103. Mounting point 104 may have three or more pairs of mounting holes drilled or otherwise formed in its upper end providing options for attaching the draw bar from the tractor to cause steel grader blade 101 to either cut, float, or tail drag.

Figure 1:
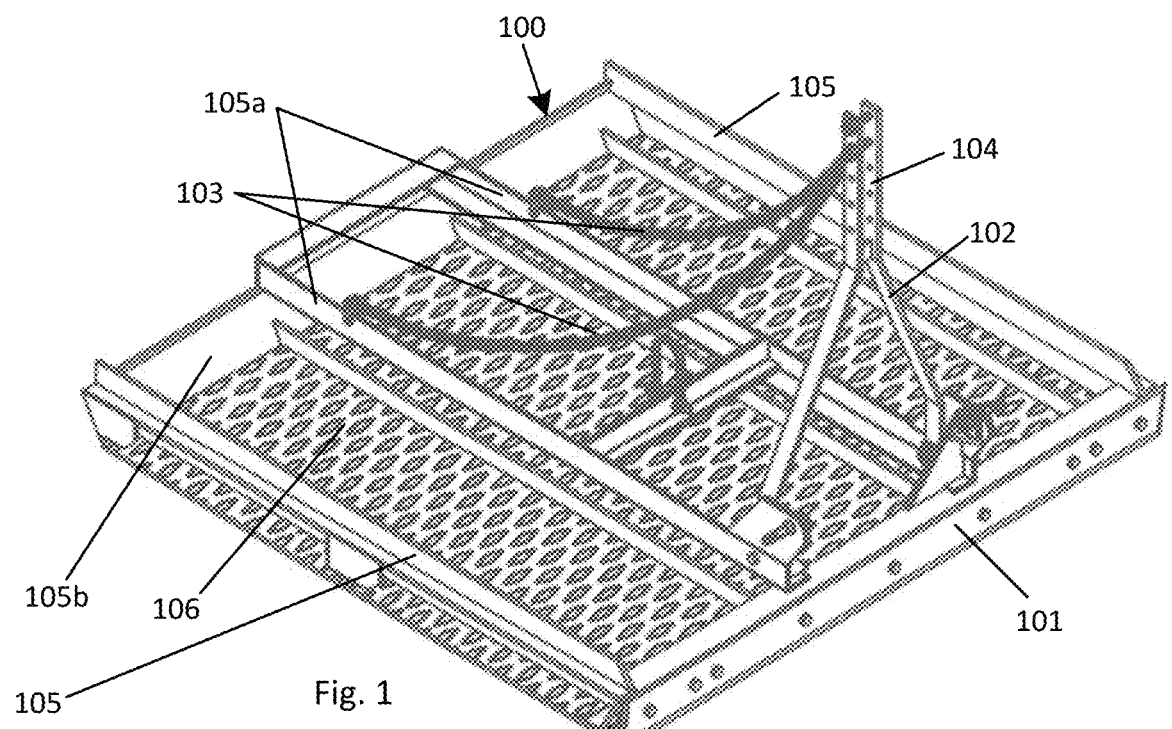
FIG. 1 is a front perspective view of the present invention.
Figure 2:
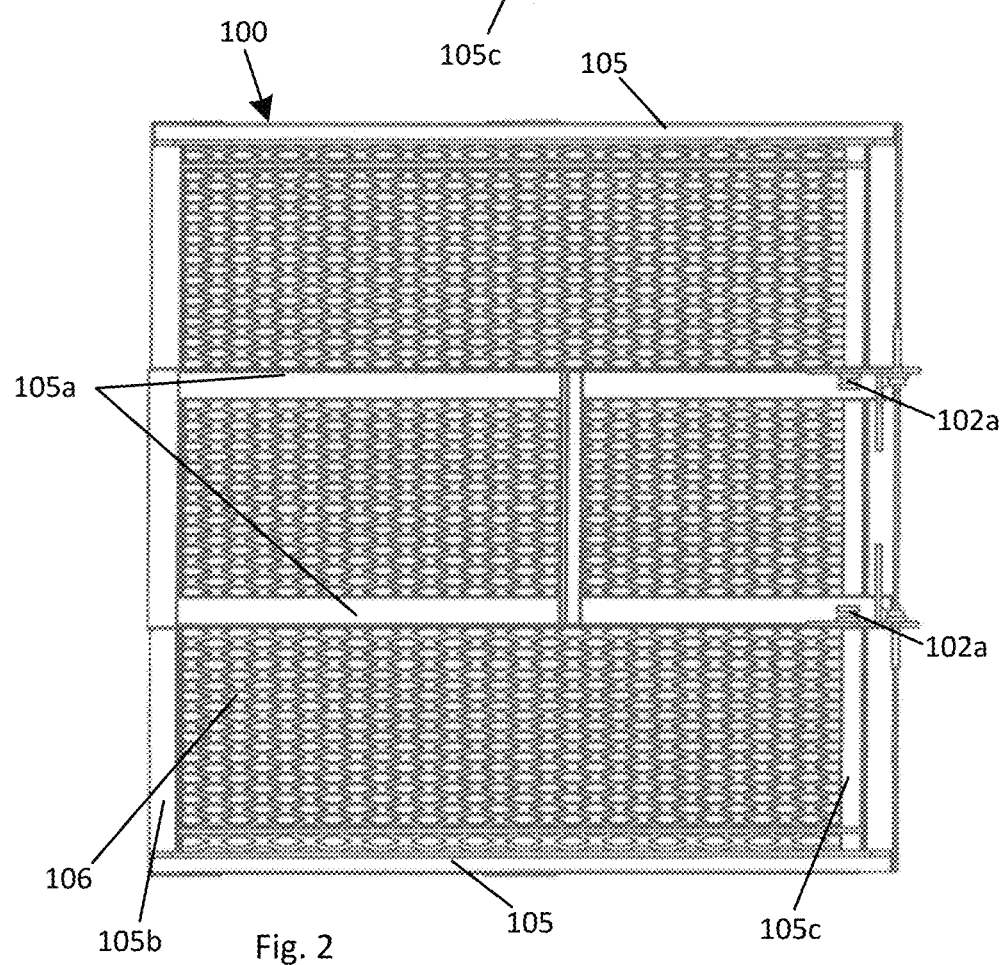
FIG. 2 is a plan view of the frame and smoothing surface of the present invention.
Figure 3:
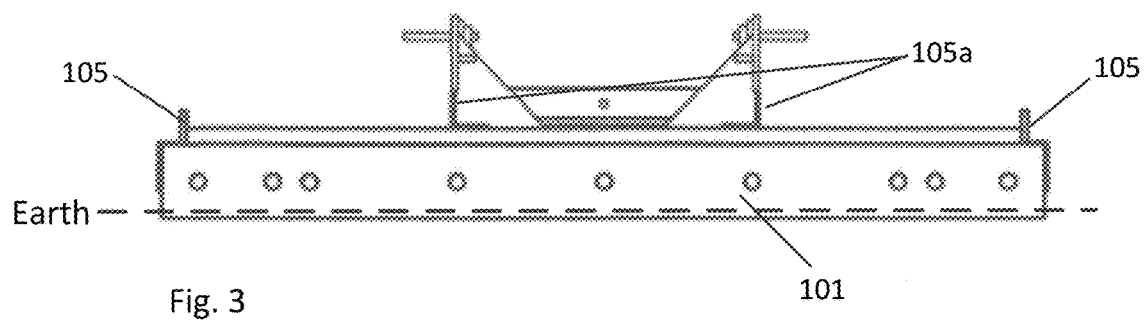
FIG. 3 is a front elevation of the frame and smoothing surface of the present invention showing the scraper blade installed at parallel to the steel frame and smoothing surface of the present invention. The level of the earth is shown indicating that the steel grader blade is parallel with level of the earth.
Figure 3A:
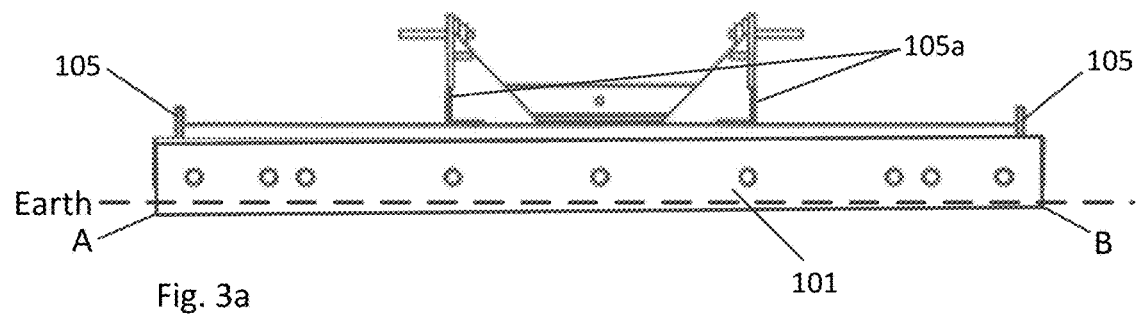
FIG. 3a is a front elevation of the frame and smoothing surface of the present invention showing the scraper blade installed at an angle with respect to the steel frame and smoothing surface of the present invention. The level of the earth is shown indicating that the steel grader blade is not parallel with level of the earth.

Turning now specifically to FIG. 3, steel grader blade 101 is affixed to steel frame 105 such that it is horizontal to the surface of the earth, i.e. it does not describe an angle with respect to the surface of the earth. Turning now specifically to FIG. 3a, steel grader blade 101 is affixed to steel frame 105 such that it is not horizontal to the surface of the earth, i.e. it describes an angle with respect to the surface of the earth. Indeed, steel grader blade 101 is affixed at an angle relative to the planar angle of steel frame 105. Specifically point "A" is 0.5° lower that point "B".

What is claimed is:

1. A grader/scraper comprising:
   a) a generally square steel frame;
   b) an expanded metal grating affixed to a bottom of the steel frame;
   c) an independent, separately adjustable, unified, flat, linear, steel grading blade affixed to a front of the steel frame when viewed from a side wherein:
      i) the steel grading blade is configured to be affixed at variable, different heights above a plane of the expanded metal grating; and
      ii) the steel grading blade is configured to be affixed such that the steel grading blade is transversely at an angle to the plane of the expanded metal grating; and
   d) an inverted Y-shaped yoke affixed to a top of the front of the steel frame;
   e) wherein a length and a width of the steel frame when viewed from above are generally the same and the transverse length of the blade is generally the same as the width of the frame when viewed from above.

2. A grader/scraper of claim 1 weighing at least 10 pounds per square foot.

3. A grader/scraper of claim 1 weighing at least 15 pounds per square foot.

4. A grader/scraper of claim 1 weighing at least 20 pounds per square foot.

5. A grader/scraper of claim 1 weighing at least 25 pounds per square foot.

6. A grader/scraper of claim 1 weighing at least 30 pounds per square foot.

7. A grader/scraper of claim 1 wherein the steel grading blade is mounted so that it lies less than one-quarter of an inch above the expanded metal grating.

8. A grader/scraper of claim 1 wherein the steel grading blade is mounted so that it lies less than one-half of an inch above the expanded metal grating.

9. A grader/scraper of claim 1 wherein the steel grading blade is mounted so that it lies less than one inch above the expanded metal grating.

10. A grader/scraper of claim 1 wherein the steel grading blade is mounted so that it lies less than two inches above the expanded metal grating.

11. A grader/scraper of claim 1 wherein the steel grading blade is mounted so that it lies two or more inches above the expanded metal grating.

12. A grader/scraper of claim 1 wherein the steel grading blade may be adjusted to any height above the expanded metal grating.

* * * * *